(12) United States Patent
Johnson

(10) Patent No.: US 7,140,174 B2
(45) Date of Patent: Nov. 28, 2006

(54) METHODS AND APPARATUS FOR ASSEMBLING A GAS TURBINE ENGINE

(75) Inventor: James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 10/955,461

(22) Filed: Sep. 30, 2004

(65) Prior Publication Data
US 2006/0064960 A1    Mar. 30, 2006

(51) Int. Cl.
F02K 3/02 (2006.01)
(52) U.S. Cl. .......................... 60/226.1; 60/262
(58) Field of Classification Search ............... 60/262, 60/762, 226.1, 226.3
See application file for complete search history.

(56) References Cited

U.S. PATENT DOCUMENTS

| 5,402,638 | A | | 4/1995 | Johnson |
| 5,435,127 | A | * | 7/1995 | Luffy et al. ............... 60/204 |
| 5,623,823 | A | * | 4/1997 | Schirle et al. ............ 60/226.3 |
| 5,694,768 | A | | 12/1997 | Johnson et al. |
| 5,813,221 | A | * | 9/1998 | Geiser et al. ............... 60/762 |
| 5,867,980 | A | * | 2/1999 | Bartos ..................... 60/226.3 |
| 6,195,983 | B1 | * | 3/2001 | Wadia et al. .............. 60/226.1 |
| 6,415,609 | B1 | * | 7/2002 | Vacek et al. ................ 60/761 |
| 6,442,930 | B1 | * | 9/2002 | Johnson et al. ........... 60/226.1 |
| 6,550,235 | B1 | * | 4/2003 | Johnson et al. .............. 60/204 |
| 6,666,018 | B1 | * | 12/2003 | Butler et al. ............. 60/226.1 |
| 6,868,665 | B1 | * | 3/2005 | Koshoffer et al. ........... 60/247 |
| 6,883,302 | B1 | * | 4/2005 | Koshoffer ................... 60/204 |
| 6,983,586 | B1 | * | 1/2006 | Tangirala et al. .......... 60/39.77 |
| 6,983,601 | B1 | * | 1/2006 | Koshoffer ................... 60/761 |
| 2005/0081509 | A1 | * | 4/2005 | Johnson .................... 60/226.1 |
| 2005/0144932 | A1 | * | 7/2005 | Cohen et al. ................ 60/204 |
| 2006/0032230 | A1 | * | 2/2006 | Freese et al. ............... 60/761 |
| 2006/0042227 | A1 | * | 3/2006 | Coffinberry ............... 60/226.1 |

* cited by examiner

Primary Examiner—William H. Rodriguez
(74) Attorney, Agent, or Firm—William Scott Andes; Armstrong Teasdale LLP

(57) ABSTRACT

A method for assembling a gas turbine engine includes providing a core engine, an inner fan assembly, and a fladed fan assembly, coupling a plurality of airflow ducts to the engine including an inner fan duct for channeling airflow through the inner fan assembly, a core engine duct for channeling airflow through the core engine, a bypass fan duct for channeling the airflow around the core engine duct, a flade duct for channeling airflow through the fladed fan assembly, and a ram duct surrounding an upstream portion of the flade duct, and coupling a plurality of control valves to the engine to control an amount of airflow channeled through each of the ducts using the plurality of control valves.

20 Claims, 3 Drawing Sheets

METHODS AND APPARATUS FOR ASSEMBLING A GAS TURBINE ENGINE

BACKGROUND OF THE INVENTION

This invention relates generally to gas turbine engines and more particularly, to methods and apparatus for assembling fladed engines.

Variable cycle engines are conventionally known for powering high performance aircraft from subsonic to supersonic speeds while attempting to obtain countervailing objectives such as high specific thrust and low fuel consumption. In other words, ideal aircraft jet engines attempt to operate through various modes of thrust and speed requirements while minimizing fuel consumption.

In reality however, such an ideal aircraft jet engine must necessarily include many compromises. For example, known high bypass ratio turbofan engines are utilized at subsonic speeds, known low bypass ratio turbofan engines or turbojet engine are used at up to moderate supersonic speeds, and known ramjet engines are utilized at high supersonic speeds. Because these three conventional engines are structurally and functionally different, the three types of engines are typically not optimally operable in multiple speed ranges.

In contrast, known variable cycle engines are generally operable over a range of operating conditions. In particular, conventional variable cycle combined turbojet or turbofan and ramjet engines generally attempt to provide for a range of operation from low subsonic Mach numbers to high supersonic Mach numbers of about Mach 6. However such turbofan-ramjet engines are relatively complex and generally include varying disadvantages. For example, at least one known turbofan-ramjet engine includes a ram burner which is wrapped around a core engine, thus creating an undesirably large diameter engine. Other known variable cycle engines include variable coannular exhaust nozzles that are relatively complex and difficult to schedule the flow area thereof. Moreover, other known variable cycle engines include coannular, separate flow paths including a coannular inlet which creates an undesirably large inlet and which typically requires an inlet diverter valve for selectively channeling inlet air flow. Other known engines may include one or more of such undesirable structures, thus resulting in an engine that is relatively complex, heavy, large, and inefficient.

BRIEF SUMMARY OF THE INVENTION

In one aspect, a method is provided for operating a gas turbine engine. The method includes providing a core engine, an inner fan assembly, and a fladed fan assembly, coupling a plurality of airflow ducts to the engine including an inner fan duct for channeling airflow through the inner fan assembly, a core engine duct for channeling airflow through the core engine, a bypass fan duct for channeling the airflow around the core engine duct, a flade duct for channeling airflow through the fladed fan assembly, and a ram duct surrounding an upstream portion of the flade duct, and coupling a plurality of control valves to the engine to control an amount of airflow channeled through each of the ducts using the plurality of control valves.

In another aspect, an airflow system is provided for a gas turbine engine, wherein the gas turbine engine includes a core engine, an inner fan assembly, and a fladed fan assembly. The airflow system includes a plurality of airflow ducts for channeling airflow through the engine, wherein the airflow ducts include an inner fan duct for channeling airflow through the inner fan assembly, a core engine duct positioned downstream of and in flow communication with the inner fan duct, wherein the core engine duct is for channeling airflow through the core engine, a bypass fan duct positioned downstream of and in flow communication with the inner fan duct, wherein the bypass fan duct is for channeling the airflow around the core engine duct, a flade duct surrounding the inner fan duct and the bypass fan duct, wherein the flade duct is for channeling airflow through the fladed fan assembly, and a ram duct surrounding an upstream portion of the flade duct. The airflow system also includes a plurality of control valves for controlling the airflow through the engine.

In a further aspect, a gas turbine engine is provided. The gas turbine engine includes a core engine that includes an inner fan duct for channeling airflow through a portion of the core engine, and at least one inner fan section including a plurality of fan blades coupled in flow communication with the inner fan duct. The engine also includes a flade system including a flade duct surrounding the core engine and including at least one fladed fan coupled in flow communication with the flade duct, wherein the fladed fan includes a plurality of fladed fan blades radially outward of, and coupled to, the inner fan section such that the fladed fan blades are driven by the inner fan section. The engine also includes a ram duct system including a ram duct surrounding a portion of the flade system, and a plurality of mode selector valves for controlling airflow between the ram jet and at least one of the flade duct and the inner fan duct.

DETAILED DESCRIPTION OF THE INVENTION

Figure 1:
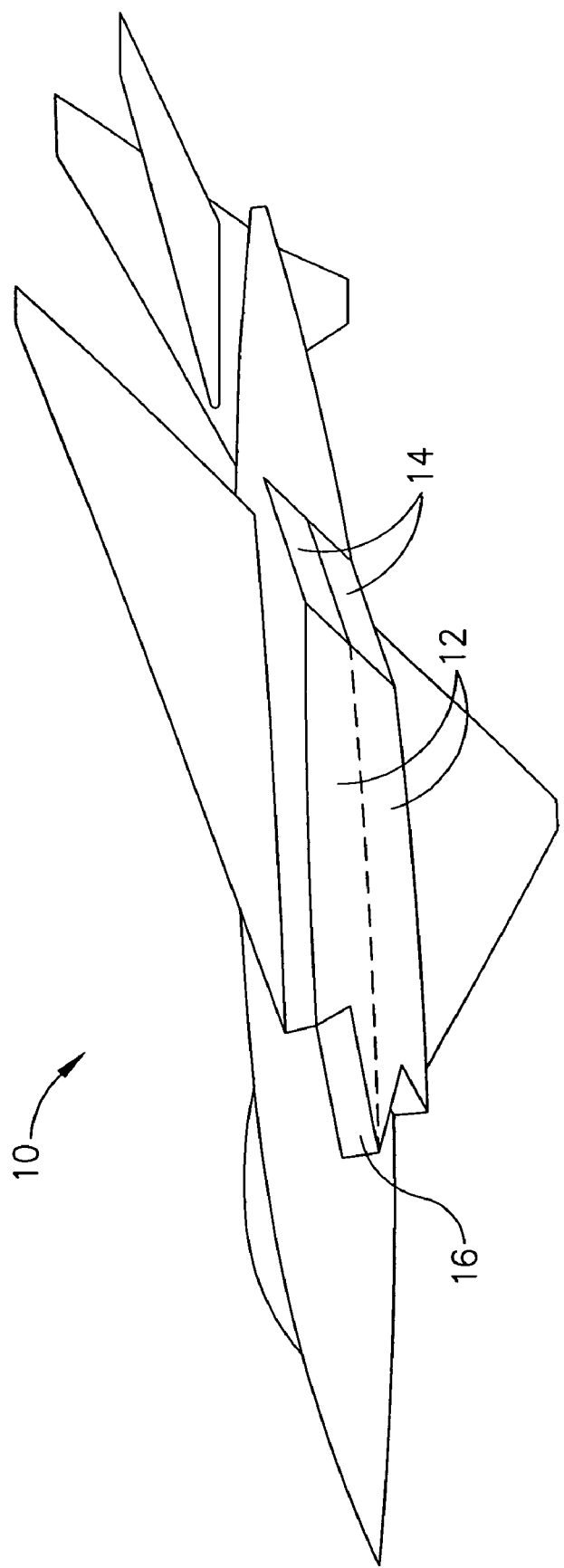
FIG. 1 is an end view of an aircraft including an exemplary engine.

FIG. 1 is a schematic illustration of a jet aircraft 10 including a plurality of engines 12 and a plurality of nozzle assemblies 14. Aircraft 10 includes an aircraft inlet 16 for channeling airflow to engines 12.

Figure 2:
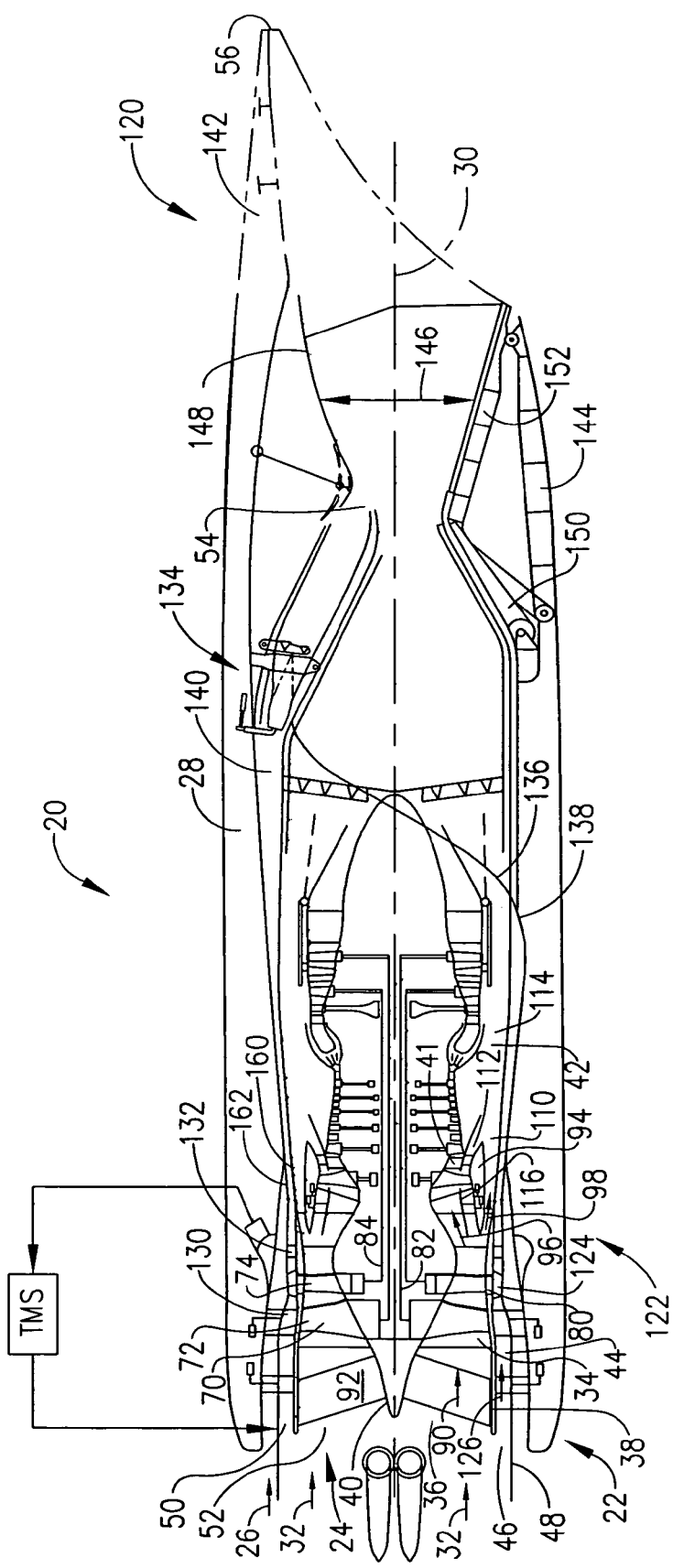
FIG. 2 is a schematic illustration of an exemplary fladed engine that may be used with the aircraft shown in FIG. 1 having mode selector valves in an open position.
Figure 3:
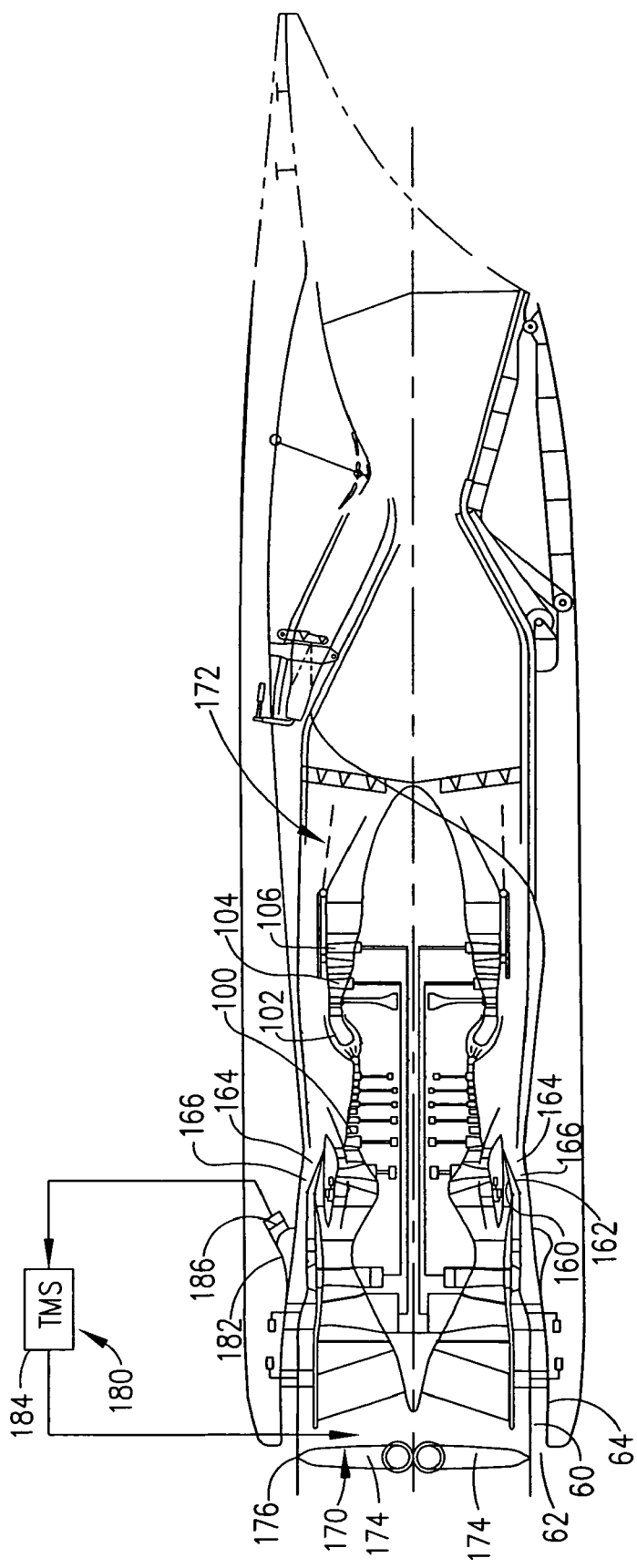
FIG. 3 is a schematic illustration of an exemplary fladed engine that may be used with the aircraft shown in FIG. 1 having the mode selector valves in a closed position.

FIG. 2 is a schematic illustration of an exemplary "fan-on-blade" or fladed engine 12 in one mode of operation. FIG. 3 is a schematic illustration of fladed engine 12 in another mode of operation. In the exemplary embodiment, engine 12 includes a core engine 20 downstream of a fan assembly 22, a flade system 24 radially outward of core engine 20 and fan assembly 22, and a ram duct system 26 disposed radially outward a portion of flade system 24. An engine casing 28 surrounds the engine components and is disposed concentrically about an axially oriented engine centerline axis 30.

Engine 12 includes a plurality of airflow ducts through which airflow 32 from the airflow inlet 16 is channeled. In the exemplary embodiment, engine 12 includes an inner fan duct 34 extending downstream from an inner fan inlet 36 and disposed concentrically around fan assembly 22. Inner fan duct 34 is defined between a fan casing 38 and an inner conical hub 40. During engine operations, engine inlet airflow 32 enters inner fan duct 34 and is channeled through fan assembly 22 and core engine 20, specifically, through inner fan duct 34 and a core engine duct 41. Additionally, a portion of the airflow channeled through fan assembly 22 bypasses core engine 20 and is exhausted downstream of core engine 20. In the exemplary embodiment, the bypassed airflow is channeled through a bypass duct 42.

Engine 12 also includes a flade duct 44 extending downstream from a flade inlet 46 and disposed concentrically around inner fan duct 34. Flade inlet 46 facilitates capturing additional airflow 32 that would otherwise spill around engine 12 leading to spillage drag losses on engine 12. Flade duct 44 is defined between fan casing 38 and a radially outer flade casing 48. In the exemplary embodiment, flade duct 44 extends between an upstream end 50, positioned proximate to a front end 52 of engine 12, and a downstream end 54, positioned proximate the exhaust area, or the common A9 expansion area, at a rear end 56 of engine 12. Flade stream air not exiting through this exhaust area will exit through cooling slots (not shown) located in other parts of rear end 56. Accordingly, a portion of total engine flow 32 captured by flade inlet 46 is channeled through engine 12 to improve engine 12 performance by increasing thrust through additional exhaust flow. Moreover, airflow 32 captured by flade inlet 46 is channeled by flade duct 44 to facilitate cooling portions of engine 12.

Engine 12 also includes a ram duct 60 extending downstream from a ram inlet 62 and disposed concentrically around an upstream portion of flade duct 44. Ram inlet 62 facilitates capturing additional airflow 32 that would otherwise spill around engine 12 leading to spillage drag losses on engine 12. Moreover, as discussed in detail below, ram inlet 62 facilitates providing airflow to power engine 12 when engine 12 is operating in a high performance mode, such as, for example, when engine 12 is operating at speeds greater than approximately Mach 4.0. Ram duct 60 is defined between flade casing 48 and a radially outer ram casing 64. In the exemplary embodiment, ram duct 60 extends axially from engine front end 52 to a position downstream and radially outward of fan assembly 22. Accordingly, airflow 32 captured by ram inlet 62 is channeled through engine 12 during certain modes of engine operation to improve engine 12 performance by providing thrust to engine 12. Moreover, airflow 32 captured by ram inlet 62 is channeled by ram duct 44 to facilitate cooling portions of engine 12.

Fan assembly 22 includes a plurality of fan blades 70. Each fan blade 70 includes a leading edge and a trailing edge and extends radially between a root and a tip. In the exemplary embodiment, fan blades 70 are arranged in a two-stage configuration such that fan assembly 22 includes a first fan stage 72 having a first row of circumferentially-spaced fan blades 70, and a second fan stage 74 having a second row of circumferentially-spaced fan blades 70. In an alternative embodiment, fan assembly 22 includes more or less than two fan stages and includes more or less than two rows of fan blades 70.

A shroud 80 extends circumferentially around, and is coupled to, each fan blade tip within second fan stage 74. In one embodiment, shroud 80 is a single annular member that is coupled to each fan blade tip within second stage 74. In another embodiment, fan assembly 22 includes a plurality of tip shrouded airfoils such that shroud 80 includes a plurality of arcuate members each coupled to at least one fan blade tip such that the arcuate members extend circumferentially around second stage 74. Shroud 80 facilitates preventing airflow from flowing between inner fan duct 34 and flade duct 44, or vice-versa. In an alternative embodiment, shroud 80 is coupled to another stage, such as, for example, first stage 72.

In the exemplary embodiment, fan assembly 22 is a counter rotating fan assembly such that first stage 72 is rotatably coupled to, and driven by, a first shaft 82, and second stage 74 is rotatably coupled to, and driven by, a second shaft 84. First and second shafts 82 and 84 operate independently with respect to each other, such that first shaft 82 operates with a first rotational speed that is different than a second rotational speed of second shaft 84. Accordingly, first stage 72 and second stage 74 have different operational speeds. In the exemplary embodiment, second shaft 84 rotates in an opposite direction than first shaft 82. In an alternative embodiment, first and second shafts 82 and 84 operate in the same rotational direction.

As illustrated in FIG. 2, during normal engine operations, airflow 32 enters inner fan inlet 36 and is channeled through inner fan duct 34. Specifically, airflow 32 is channeled as a fan stream 90 through a plurality of inlet guide vanes 92 towards first stage 72 between fan casing 38 and hub 40. As fan stream 90 is channeled through the first row of fan blades 70, the density of fan stream 90 is increased. Fan stream 90 is then channeled through the second row of fan blades 70 wherein the density of fan stream 90 is further increased. Once fan stream 90 is channeled through fan assembly 22, the airflow is divided by a splitter 94 into a core engine stream 96 and a bypass stream 98. More specifically, splitter 94 is oriented downstream of fan assembly 22 to facilitate dividing fan stream 90 to enable engine to meet engine overall performance requirements relating to thrust and airflow pressure ratios. Core engine stream 96 is channeled through core engine 20. Specifically, core engine stream is channeled through a compressor 100, a combustor 102, a high pressure turbine 104, and a low pressure turbine 106.

Additionally, bypass stream 98 is channeled through bypass duct 42. In the exemplary embodiment, bypass duct 42 includes a forward bypass duct 110, an intermediate bypass duct 112, and an aft bypass duct 114. Forward bypass duct is positioned between splitter 94 and fan casing 38, intermediate bypass duct is positioned between splitter 94 and a core engine liner 116, and aft bypass duct is positioned downstream of forward and intermediate bypass ducts 110 and 112 and extends between core engine 22 and fan casing 38. In the exemplary embodiment, intermediate bypass duct 112 channels a portion of core engine stream 96 to bypass duct 42. Bypass ducts 110, 112 and 114 are in flow communication with one another when engine 12 is operating in the normal mode. Additionally, the airflow through bypass duct 42 and the core engine stream 96 are burned in the engine afterburner (not shown) before being exhausted from engine 12 through an exhaust nozzle assembly 120.

In the exemplary embodiment, fan assembly 22 also includes a fladed fan assembly 122 that includes a plurality of fladed rotor blades 124 positioned within flade duct 44. Each fladed blade 124 includes a leading edge and a trailing edge and extends radially between a root and a tip. In the exemplary embodiment, fladed blades 124 are arranged in a row that extends circumferentially around shroud 80. Fladed blades 124 produce a flade stream 126 of airflow that is channeled through flade duct 44.

Each fladed blade 124 is drivenly coupled to shroud 80 at the blade root and extends radially outward from shroud 80. In one embodiment, each fladed blade 124 is coupled to shroud 80 via, for example, a welding process, such as, but not limited to, an inductive welding process. In another embodiment, fladed blades 124 are unitarily formed with shroud 80. Fladed blades 124 have a radial height, extending between blade root and blade tip, that is selected to facilitate improving an efficiency potential of flade stream 126, while reducing the risk of exceeding tip speed constraints.

A row of circumferentially spaced variable area inlet guide vanes 130 are positioned within flade duct 44 upstream of fladed blades 124. Inlet guide vanes 130 are operable to channel airflow 32 towards fladed blades 124 and meter the volume of airflow 32 entering flade stream 126. As the airflow is channeled through fladed blades 124 the airflow is compressed. Airflow discharged from fladed blades 124 passes through a row of circumferentially spaced outlet guide vanes 132 which change the direction of the airflow to facilitate reducing the rotary velocity component of the airflow. During the normal operational mode of engine 12, flade stream 126 is then channeled downstream through flade duct 44 prior to being exhausted through exhaust nozzle assembly 120. Accordingly, flade stream 126 increases an amount of high pressure airflow available, thus facilitating increasing the overall performance and/or thrust of engine 12.

In the exemplary embodiment, flade system 24 also includes a flade stream augmentor 134 to facilitate increasing the thrust output, and therefore the overall performance of engine 12. Augmentor 134 is positioned in flade duct 44 such that a portion of flade stream 126 is mixed with a fuel, ignited and then exhausted downstream of augmentor 134 into the exhaust area, or the common A9 expansion area, at flade duct downstream end 54.

Flade system 24 also includes a flade duct scroll 136 that channels a portion of flade stream 126 from a lower flade section 138 to an upper flade section 140. A portion of flade duct 44 continues downstream from flade duct scroll 136 such that flade stream 126 in that portion facilitates cooling fan casing 38 and/or exhaust nozzle assembly 120 proximate engine rear end 56. In one embodiment, by way of example only, approximately 20%–30% of flade stream 126 continues downstream of flade duct scroll 136 in the corresponding flade duct 44. In other embodiments, more or less of flade stream 126 continues downstream of flade duct scroll 136 to facilitate improving the cooling efficiency of flade duct 44. In the exemplary embodiment, flade duct scroll 136 extends to upper flade section 140 and is positioned upstream of augmentor 134. Specifically, flade duct scroll 136 channels flade stream 126 upstream of augmentor 134 to facilitate increasing the amount of flade stream airflow that enters augmentor 134 for combustion. As such, the overall thrust potential of engine 12 is increased.

The discharge from core engine, bypass and flade ducts 41, 42 and 44, respectively, are mixed in exhaust nozzle assembly 120 and exhausted from engine 12. In the exemplary embodiment, nozzle assembly 120 includes an upper nozzle section 142 and a lower nozzle section 144. Exhaust area 146 is defined by the inner surface of a nozzle liner 148 between the upper and lower nozzle sections 142 and 144, respectively. Additionally, a front flap 150 and a rear flap 152 are coupled to lower nozzle section 144 and are moveable such that throat area 146 is variable. Specifically, throat area 146 is increased and/or decreased depending on the mode of operation and/or the required thrust output of engine 12.

In the exemplary embodiment, engine 12 includes a plurality of control valves for controlling an amount of airflow channeled through each of the airflow ducts. In the exemplary embodiment, engine 12 includes an inner mode selector valve 160 and an outer mode selector valve 162 each of which are variably positionable between a fully open position, as illustrated in FIG. 2, and a fully closed position, as illustrated in FIG. 3. In the open position, inner mode selector valve 160 defines a portion of fan casing 38, and outer mode selector valve 162 defines a portion of flade casing 48. Additionally, in the open position, mode selector valves 160 and 162 restrict airflow in ram duct 60. In the closed position, mode selector valves 160 and 162 define a flow path of the airflow in ram duct 60 and restrict airflow through fan duct 34 and flade duct 44.

Inner modes selector valve 160 is positioned radially outward of a portion of forward bypass duct 110. When inner mode selector valve 160 is positioned in the open position, forward bypass duct 110 is opened, and airflow is channeled through forward bypass duct 110 between inner fan duct 34 and aft bypass duct 114. When inner mode selector valve 160 is positioned in the closed position, forward bypass duct 110 is closed, and airflow is restricted from being channeled through forward bypass duct 110 between inner fan duct 34 and aft bypass duct 114. Additionally, when inner mode selector valve 160 is positioned in the closed position, an inner ram opening 164 is formed in fan casing 38 such that airflow is channeled through inner ram opening 164 between ram duct 60 and aft bypass duct 114.

Outer modes selector valve 162 is positioned radially outward of a inner mode selector valve 160. When outer mode selector valve 162 is positioned in the open position, flade duct 44 is opened, and airflow is channeled through flade duct 44 between upstream and downstream ends 50 and 54, respectively. When outer mode selector valve 162 is positioned in the closed position, flade duct 110 is closed, and airflow is restricted from being channeled between upstream and downstream ends 50 and 54. Additionally, when outer mode selector valve 162 is positioned in the closed position, an outer ram opening 166 is formed in flade casing 48 such that airflow is channeled through outer ram opening 166 between ram duct 60 and the downstream portion of flade duct 44.

Inner and outer mode selector valves 160 and 162 are selectively positionable in intermediate positions to allow a portion of the airflow in ram duct 60 to be channeled into both flade and aft bypass ducts 44 and 114, respectively. The airflow is then channeled through the flade and aft bypass ducts 44 and 114 into the exhaust nozzle assembly 120 to power the aircraft. In one embodiment, the airflow is channeled to a ram burner, such as augmentor 134, for conventional ramjet operation. In the exemplary embodiment, inner and outer mode selector valves 160 and 162 are controlled by a control system (not shown) for operating valves 160 and 162 in accordance with engine 12 overall performance and output requirements.

In the exemplary embodiment, engine 12 also includes a front closure system 170 and a rear closure system 172 each of which are variably positionable between a fully open position, as illustrated in FIG. 2, and a fully closed position, as illustrated in FIG. 3. Closure systems 170 and 172 control an amount of airflow entering and/or exiting fan assembly 22 and core engine 20 and are operated by a control system (not shown) similar to that used by valves 160 and 162. Specifically, as less airflow is required to be channeled through fan assembly 22 and/or core engine 20, closure systems 170 and/or 172 are transferred from the open position to the closed position. In one embodiment, systems 170 and/or 172 are in the open position when engine 12 is operating in a normal mode of operation, such as, for example, at flight speeds approaching approximately Mach 3.0. In contrast, closure systems 170 and/or 172 are in the closed position when engine 12 is operating in a high performance mode of operation, such as, for example, at flight speeds greater than approximately Mach 4.0. Additionally, closure systems 170 and/or 172 are operable in an intermediate position in accordance with engine 12 overall performance and output requirements.

Front closure system 170 includes a plurality of closing flaps 174 positioned at engine front end 52. In the exemplary embodiment, closing flaps 174 are coupled to engine adjacent engine centerline axis 30 and are rotatable such that a tip 176 of each closure flap 174 abuts against flade casing 48 when closure flaps 174 are in the fully closed position. Accordingly, in the closed position, a minimal amount of airflow is channeled into fan duct 34 and flade duct 44, core engine 20 is shut down, thereby reducing an amount of fuel consumption, and engine 12 is in a ramjet operation, wherein engine is powered by the exhaust produced by the airflow entering ram duct 60. However, in the ramjet mode of operation, a high amount of thermal stress is placed on the internal components of engine 12, specifically, on fan assembly 22 and core engine 20. Accordingly, in the exemplary embodiment, engine 12 includes a thermal management system 180.

Thermal management system 180 includes an auxiliary duct 182 in flow communication with, and receiving airflow from, ram duct 60, and a heat exchanger 184, such as, for example, a fuel air heat exchanger, for cooling the airflow in auxiliary duct 182. Auxiliary duct 182 includes a thermal management system valve 186 for controlling an amount of airflow entering auxiliary duct 182 from ram duct 60. Auxiliary duct 182 channels airflow from ram duct 60 to the upstream end of inner fan duct 34 and/or flade duct 44 for cooling the components contained therein. In the exemplary embodiment, thermal management system 180 is operated when front closure system 170 is in the closed position, and/or when a reduced amount of airflow is channeled through inner fan duct 34 and flade duct 44.

The above-described flade engines are cost-effective and highly reliable. The flade engine includes a core engine, a fan assembly, a flade system and a ramjet system for increasing the overall performance and reducing the operating cost of the engine. The flade system includes a flade duct for capturing a portion of the airflow spilled around the fan inlet and increasing the amount of thrust generated by the engine. Additionally, the engine includes a ram duct for capturing airflow spilled around the flade duct and for operating the engine as a ramjet at high flight speeds. A plurality of control valves are provided for controlling the amount of airflow through each of the systems. As a result, the engine operates in multiple flight conditions and at multiple flight speeds.

Exemplary embodiments of flade engines are described above in detail. The flade engines are not limited to the specific embodiments described herein, but rather, components of each flade engine may be utilized independently and separately from other components described herein. For example, each flade engine component can also be used in combination with other flade engine components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a core engine, an inner fan assembly, and a fladed fan assembly;
   coupling a plurality of airflow ducts to the engine including an inner fan duct for channeling airflow through the inner fan assembly, a core engine duct for channeling airflow through the core engine, a bypass fan duct for channeling the airflow around the core engine duct, a flade duct for channeling airflow through the fladed fan assembly, and a ram duct surrounding an upstream portion of the flade duct; and
   coupling a plurality of control valves to the engine to control an amount of airflow channeled through each of the ducts using the plurality of control valves.

2. A method in accordance with claim 1 wherein coupling a plurality of control valves comprises coupling a plurality of mode selector valves to the engine that are selectively positionable in one of an open position, an intermediate position, and a closed position.

3. A method in accordance with claim 1 wherein coupling a plurality of control valves comprises coupling an inner mode selector valve and an outer mode selector valve to the engine such that:
   when positioned in an open position, the inner mode selector valve controls airflow between the inner fan duct and the bypass duct; and the outer mode selector valve controls airflow between an upstream portion and a downstream portion of the flade duct;
   when positioned in an intermediate position, the inner and outer mode selector valves control the airflow entering the ram duct to be channeled into at least one of the flade duct and the bypass duct; and
   when positioned in a closed position, the inner and outer mode selector valves control the airflow between the ram duct and at least one of the flade duct and the bypass duct.

4. A method in accordance with claim 1 wherein coupling a plurality of control valves comprises coupling a front closure system to the engine including a plurality of closing flaps positioned upstream of the inner fan duct and the flade stream, wherein the closing flaps are positionable in one of an open position, an intermediate position, and a closed position to control an amount of airflow channeled into each of the ducts.

5. A method in accordance with claim 1 wherein coupling a plurality of airflow ducts further comprises:
   coupling an auxiliary duct in flow communication with the ram duct; and
   coupling a thermal management system valve in the auxiliary duct, wherein the thermal management system includes a heat exchanger that is coupled in flow communication between the ram duct and the auxiliary duct, and is coupled in flow communication to at least one of the inner fan duct and the flade duct.

6. An airflow system for a gas turbine engine, wherein the gas turbine engine includes a core engine, an inner fan assembly, and a fladed fan assembly, said airflow system comprising:
   a plurality of airflow ducts for channeling airflow through the engine, said airflow ducts comprise:
   an inner fan duct for channeling airflow through the inner fan assembly;
   a core engine duct positioned downstream of, and in flow communication with, the inner fan duct, said core engine duct for channeling airflow through the core engine;
   a bypass fan duct positioned downstream of, and in flow communication with, the inner fan duct, said bypass fan duct for channeling the airflow around said core engine duct;

a flade duct surrounding said inner fan duct and said bypass fan duct, said flade duct for channeling airflow through the fladed fan assembly; and a ram duct surrounding an upstream portion of said flade duct; and a plurality of control valves for controlling the airflow through the engine.

7. An airflow system in accordance with claim 6 wherein said flade duct is configured to capture at least a portion of airflow channeled around said inner fan duct, said ram duct is configured to capture at least a portion of airflow channeled around said flade duct.

8. An airflow system in accordance with claim 6 wherein said bypass duct comprises a forward bypass duct positioned downstream from said inner fan duct, an intermediate bypass duct positioned between said forward bypass duct and said core engine duct, and an aft bypass duct, said plurality of control valves comprise an inner mode selector valve and an outer mode selector valve, said inner mode selector valve for controlling airflow in said forward bypass duct such that, when said inner mode selector valve is in a closed position, airflow is restricted between said inner fan duct and said aft bypass duct, said outer mode selector valve for controlling airflow in said flade duct such that, when said outer mode selector valve is in a closed position, airflow is restricted between an upstream end and a downstream end of said flade duct.

9. An airflow system in accordance with claim 6 wherein said plurality of control valves comprise an inner mode selector valve and an outer mode selector valve, said inner mode selector valve for controlling airflow between said inner fan duct and said bypass duct such that, when said inner mode selector valve is in a closed position, said ram duct is in flow communication with said bypass duct, said outer mode selector valve for controlling airflow in said flade duct such that, when said outer mode selector valve is in a closed position, said ram duct is in flow communication with said flade duct.

10. An airflow system in accordance with claim 6 wherein said plurality of control valves comprise at least one closing flap positioned upstream from said inner fan duct and said flade duct, said closing flaps moveable between an open position and a closed position, said closing flaps for controlling an amount of airflow entering said inner fan duct and said flade duct.

11. An airflow system in accordance with claim 6 wherein said plurality of control valves comprise a rear closure system positioned proximate a downstream end of said core engine, said rear closure system comprising a plurality of closing flaps for controlling an amount of airflow exiting said core engine duct.

12. An airflow system in accordance with claim 6 further comprising a thermal management system for controlling a temperature of airflow channeled through the engine, and an auxiliary duct coupled in flow communication with said ram duct for channeling a portion of airflow from said ram duct to an upstream end of at least one of said inner fan duct and said flade duct.

13. A gas turbine engine comprising:

a core engine comprising an inner fan duct for channeling airflow through a portion of said core engine, and at least one inner fan section a plurality of fan blades coupled in flow communication with said inner fan duct;

a flade system comprising a flade duct surrounding said core engine and comprising at least one fladed fan coupled in flow communication with said flade duct, said fladed fan comprising a plurality of fladed fan blades radially outward of, and coupled to, said inner fan section such that said fladed fan blades are driven by said inner fan section; and a ram duct system comprising a ram duct surrounding a portion of said flade system, and a plurality of mode selector valves for controlling airflow between said ram jet and at least one of said flade duct and said inner fan duct.

14. A gas turbine engine in accordance with claim 13 wherein said flade duct is configured to capture at least a portion of airflow channeled around said inner fan duct, said ram duct is configured to capture at least a portion of airflow channeled around said flade duct.

15. A gas turbine engine in accordance with claim 13 wherein said mode selector valves are moveable between an open position, an intermediate position, and a closed position, wherein when said mode selector valves are in said open position, air is channeled through said core engine and said flade system, when said mode selector valves are in said intermediate position, at least a portion of airflow is channeled through said ram duct into at least one of said flade duct and said inner fan duct, and when said mode selector valves are in said closed position said core engine is shut down.

16. A gas turbine engine in accordance with claim 13 further comprising a front closure system comprising a plurality of closing flaps for restricting airflow into said inner fan duct and said flade duct, said front closure system operable between an open position and a closed position to facilitate controlling an amount of airflow entering said inner fan duct and said flade duct.

17. A gas turbine engine in accordance with claim 13 wherein said ram duct system comprises a thermal management system coupled in flow communication with said ram duct, said thermal management system comprises an auxiliary duct for channeling a portion of airflow into said ram duct and a heat exchanger for cooling airflow in said auxiliary duct, said auxiliary duct coupled in flow communication with at least one of said flade duct and said inner fan duct.

18. A gas turbine engine in accordance with claim 17 further comprising a thermal management system valve for controlling an amount of airflow entering said auxiliary duct, and a front closure system for controlling an amount of airflow entering said inner fan duct and said flade duct, said thermal management system and said front closure system cooperating with one another to facilitate maintaining engine operating temperatures.

19. A gas turbine engine in accordance with claim 13 further comprising a flade stream augmentor positioned proximate a downstream end of said flade duct, said flade stream augmentor facilitates increasing the thrust of said engine.

20. A gas turbine engine in accordance with claim 13 further comprising an exhaust nozzle assembly positioned downstream of and in flow communication with said core engine, said flade system, and said ram duct system.

* * * * *